United States Patent [19]

Corona

[11] Patent Number: 4,491,040
[45] Date of Patent: Jan. 1, 1985

[54] COMPOSITE HOLDER AND OPENER FOR USE WITH AN EXPRESSO COFFEEMAKER

[76] Inventor: Oscar M. Corona, 2356 W. 53rd Ter., Hialeah, Fla. 33016

[21] Appl. No.: 376,426

[22] Filed: May 10, 1982

[51] Int. Cl.³ .............................................. B67B 7/44
[52] U.S. Cl. .................................. 81/3.1 R; 7/151; 248/346; 81/3.32; 81/3.39
[58] Field of Search ................. 81/3.32, 3.4, 3.31, 81/3.39, 3.3, 3.34, 3.1 R; 7/151; 99/279; D44/26; 248/346; D8/37

[56] References Cited

U.S. PATENT DOCUMENTS

| | | | |
|---|---|---|---|
| 529,953 | 11/1894 | Presnell | 81/3.32 |
| 638,646 | 12/1899 | Robeson | 81/3.32 |
| 1,615,196 | 1/1927 | Lilja | 81/3.39 |
| 1,913,906 | 6/1933 | Swenson | 81/3.4 |
| 2,810,311 | 10/1957 | Smith | 81/3.4 |
| 3,121,355 | 2/1964 | Morel et al. | 81/3.4 |
| 3,760,657 | 9/1973 | Muir et al. | 81/3.4 |
| 3,805,643 | 4/1974 | Turner et al. | 81/3.32 |
| 3,812,741 | 5/1974 | Heine | 81/3.4 |
| 3,950,801 | 4/1976 | Morrison | 81/3.2 |
| 3,999,261 | 12/1976 | Bingaman | 269/289 |
| 4,038,914 | 8/1977 | Crespo et al. | 99/279 |
| 4,171,650 | 10/1979 | Cardinal | 81/3.2 |

FOREIGN PATENT DOCUMENTS 2719440  11/1978  Fed. Rep. of Germany ......... 81/3.4

Primary Examiner—Roscoe V. Parker
Attorney, Agent, or Firm—Daniel H. Bobis

[57] ABSTRACT

A holder and opener having a planar member with at least one side and an upper and lower face, a transverse shoulder connected to the side of the planar member, and a plurality of shaped indentations in the upper face for sliding fit engagement with an expresso coffeemaker.

8 Claims, 8 Drawing Figures

U.S. Patent   Jan. 1, 1985   4,491,040
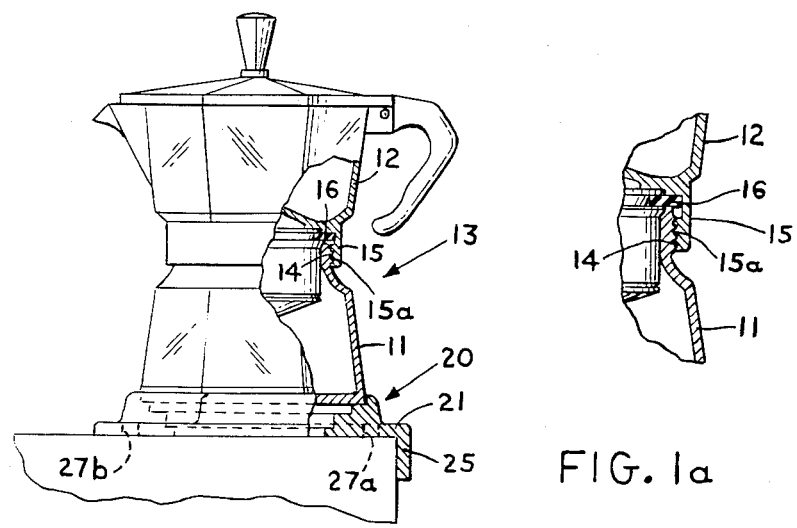
FIG. 1
FIG. 1a
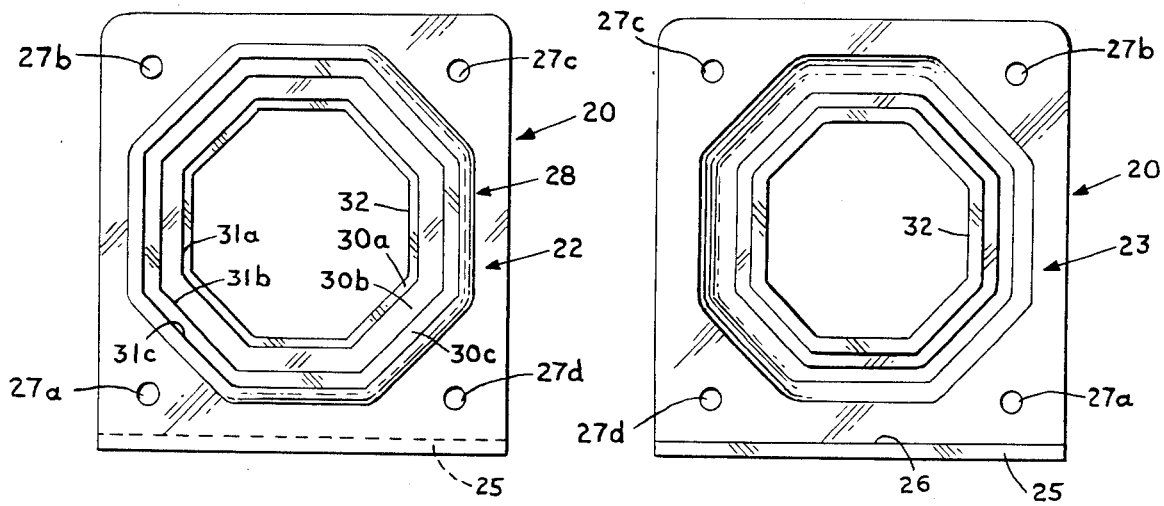
FIG. 2
FIG. 3
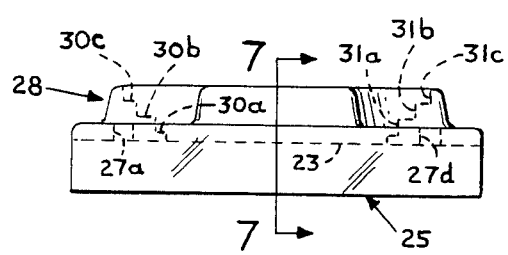
FIG. 4
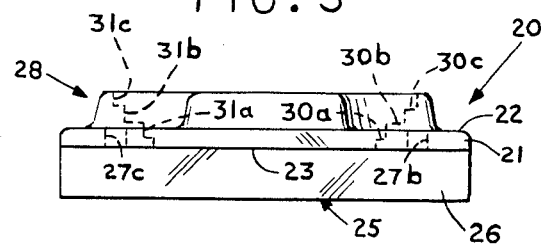
FIG. 5
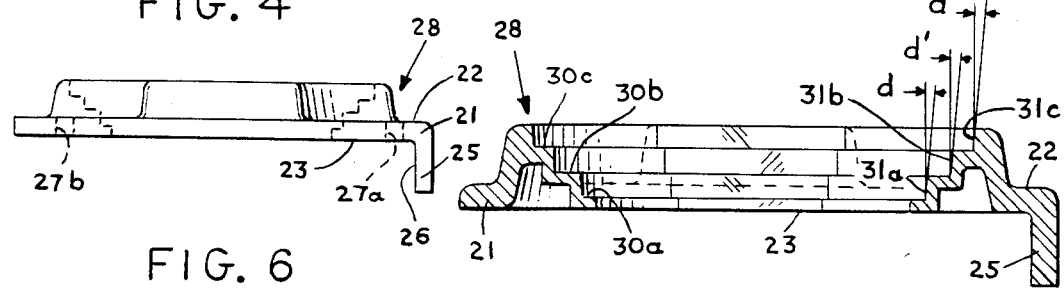
FIG. 6
FIG. 7

4,491,040

COMPOSITE HOLDER AND OPENER FOR USE WITH AN EXPRESSO COFFEEMAKER

BACKGROUND OF THE INVENTION

This invention relates generally to a tool for loosening or separating tight fitting threaded or otherwise connected matching components and more particularly to a composite holder and opener adapted for use in holding an expresso coffeemaker to aid in separating the threaded connecting sections thereon.

Expresso coffeemakers are well known in the culinary utensil art and are available in a variety of cup sizes and shapes. Many of these coffeemakers have a generally octagonally shaped base and are made of cast aluminum, stainless steel or other material capable of withstanding the heat applied to the coffeemaker to bring the brewing water used therein to a boil.

In the octagonally shaped expresso coffeemakers to which the present invention is particularly adapted, there is a lower compartment and an upper compartment which are joined together at the medial section of the coffeemaker by means of a threaded seal assembly which permits the upper compartment to be mounted on the lower compartment so as to provide a water tight seal therebetween. In the use of such expresso coffeemakers when the coffeemaker is allowed to cool the contracting forces of the metal create an extremely tight seal between the upper compartment and the lower compartment and it becomes difficult to manually separate the threaded seal assembly so as to permit the expresso coffeemaker to be properly cleaned and prepared for reuse.

The prior art shows coffee pot holders in U.S. Pat. No. 529,953, jar gripping devices as in U.S. Pat. Nos. 1,615,196 and 3,999,261, and jar lid opening devices as in U.S. Pat. Nos. 3,950,801 and 4,171,650. However, these devices are not adapted to meet the problems of aiding and abeting the separation of the threaded components of more particularly an octagonally shaped expresso coffeemaker.

The present invention provides an improved composite device which is designed to provide both a holder into which the lower compartment of the expresso coffeemaker fits so that it can act as a hot plate and so formed that it will engage the lower compartment and hold it in an immovable position to allow manual rotation of the upper compartment relative thereto and thus assist and abet the breaking of the water tight seal between the threaded connecting sections of the lower compartment and upper compartment of the expresso coffeemaker.

The device in accordance with the present invention consists of a generally planar member which can be fixedly positioned and has means on at least one face thereof which is shaped and sized to match and mate with the lower compartment of an expresso coffeemaker, to hold the same in an immovable position when it is attempted to break the threaded seal assembly forming the connecting elements of these compartments.

SUMMARY OF THE INVENTION

Thus, the present invention covers a composite holder and opener for loosening or disconnecting tightly fitted matching elements such as threaded components on containers, preferably molded from plastic material in the form of a planar member having on the upper surface thereof a plurality of shaped and sized indentations at least one of which is adapted to engage and fit one of the matching elements of the tightly fitted connection, and means on the planar member to prevent accidental movement or rotation thereof during use.

Additionally, the composite holder and opener as above described in combination with a container such as an expresso coffeemaker having a predetermined sized and shaped lower compartment thereon wherein the spaced and sized plurality of indentations have a shape adapted to match and fit the size and shape of the lower compartment of the expresso coffeemaker.

Accordingly, it is an object of the present invention to provide a simple, low-cost, effective composite holder and opener adapted to aid and abet the loosening or disconnecting of tightly fitted matching components such as threaded components on a container.

It is another object of the present invention to provide a composite opener and holder preferably molded or otherwise fabricated from plastic material for disconnecting or loosening tightly fitted matching components such as threaded connecting elements.

It is another object of the present invention to provide a simple low-cost composite holder and opener adapted to act as a hot plate for the shaped lower compartment of a container and to aid and abet the breaking and loosening of the water tight seal of the threaded connection between the lower compartment and upper compartment of the container.

It is a still further object of the present invention to provide a composite holder and opener adapted for use in disconnecting the threaded connections between the lower compartment and upper compartment of an octagonally shaped expresso coffeemaker.

Further objects, features and advantages of the present invention will be more fully appreciated by reference to the following detailed description of one illustrated embodiment in accordance with the present invention when taken in conjunction with the accompanying drawings,

BRIEF DESCRIPTION OF THE DRAWINGS

FIG. 1 is a perspective view of one form of composite holder and opener in accordance with the present invention showing the preferred use thereof with an expresso coffeemaker partly broken away in vertical section to show the matching components of the threaded connecting section thereon and the interrelation of the lower compartment of the expresso coffeemaker with the matching indentations on the face of the composite holder and opener.

FIG. 1A is an enlarged view of the threaded connecting section of the expresso coffeemaker shown in FIG. 1.

FIG. 2 is a top plan view of the composite holder and opener shown in FIG. 1.

FIG. 3 is a bottom plan view of the composite holder and opener shown in FIG. 1.

FIG. 4 is a front view of the composite holder and opener shown in FIG. 1

FIG. 5 is a back view of the composite holder and opener shown in FIG. 1.

FIG. 6 is a left side view of the composite holder and opener shown in FIG. 1.

FIG. 7 is a cross-section taken on line 7—7 of FIG. 4 slightly enlarged to show the tapering risers on the spaced plurality of indentations.

DESCRIPTION OF A PREFERRED EMBODIMENT

Referring to the drawings FIG. 1 shows an expresso coffeemaker generally designated 10 and one form of composite holder and opener 20 in accordance with the present invention disposed in operative engagement.

The expresso coffeemaker 10 is one of the conventional designs and has a lower compartment 11 and an upper compartment 12 which are connected to each other by means of the threaded connection section as at 13 in the medial section of the expresso coffeemaker. The lower compartment 11 has threaded section 14 about the upper annular end thereof which defines an opening or mouth. The upper compartment 12 has an annular collar 15 which is threaded as at 15a to fit and engage the threaded section 14 of the lower compartment. The annular collar 15 is so constructed that a sealing gasket as at 16 fits about the annular collar so that when the upper compartment is connected to the lower compartment by threading the annular collar onto the threaded section 14 a water tight seal will be formed between the lower compartment 11 and upper compartment 12.

Expresso coffeemakers of the type herein shown are well known devices, easily purchaseable on the open market and hence are not more fully described herein. However, those skilled in the art will readily recognize that the threaded section 14, the threaded section 15, and sealing gasket 16 which form the fluid tight seal between the compartments will during the use of the expresso coffeemaker form an extremely tight joint that must be opened to disassemble the expresso coffeemaker so that it can be cleaned and charged with expresso coffee for reuse.

The composite holder and opener 20 as illustrated in FIGS. 1 to 7 of the drawings is adapted to act both as a hot plate to hold the hot expresso coffeemaker on any desired surface after the expresso coffeemaker has been charged and expresso coffee brewed therein and after the expresso coffeemaker has cooled to provide a tool to assist and aid the user of the expresso coffeemaker to break the joint or connection when it is desired to clean and reuse the expresso coffeemaker which composite holder and opener will now be described.

Thus referring to FIGS. 1 to 7 of the drawings, the composite holder and opener 20 is shown as having a generally planar body 21 having, an upper face 22 and a lower face 23 which is adapted to fit onto any convenient supporting surface such as a table top or counter as shown in FIG. 1.

The planar body 21 is intended to be molded, cast machined or otherwise fabricated from any suitable type of heat resistant and heat insulating plastic material such as ABS, Lexxan, Lucite, Plexiglass, Acrylic and the like materials, as well as other materials such as anodized aluminum, brass and other metals of equal stability and resistance to heat and the transmittal of heat which prevail when this hot expresso coffeemaker is placed on the composite holder and opener. The plastic or other material selected must also have sufficient tensile strength and a thickness as hereinafter described to also meet the torsional stresses which are applied when the composite holder and opener is used to aid and abet the loosening of the connecting joint and disassembly of the upper and lower compartments of the expresso coffeemaker.

In FIGS. 2 to 6 of the drawings, a transverse shoulder 25 is connected generally perpendicular to the planar body 21 preferably along one side thereof so that when the planar body 21 is placed on the table top or counter the inside face 26 of the transverse shoulder 25 can be brought into abutment therewith so as to prevent the planar body 21 from moving when the expresso coffeemaker is placed in position thereon as is shown in FIG. 1 and rotating when it is necessary to separate the threaded components 16 and 18.

FIGS. 1, 2 and 3 of the drawings also show a plurality of openings as at 27a, 27b, 27c and 27d inwardly of the corners of the generally square planar member 21. These will permit any suitable connecting members such as screws to be inserted therethrough to connect the composite holder and opener 20 to the surface so as to prevent movement and/or rotation thereof. In this arrangement the transverse member 25 can be eliminated to enable the composite holder and opener to be placed on a supporting surface where the transverse member would interfere with the use thereof. This is inherent in the construction and an alternate to the preferred form of composite holder and opener shown in the drawings.

Referring now to FIGS. 2, 3, 4, 5 and 7 of the drawings, the composite holder and opener in accordance with the present invention is shown as having a generally circular raised section 28 on the upper face or surface 22 thereof which will provide a desired thickness for forming a plurality of concentric, octaganally shaped serially disposed indentations or ledges 30a, 30b and 30c having increasing diameters from the innermost ledge 30a to the outermost ledge 30c in stepped fashion and as shown at FIGS. 4, 5 and 7 of the drawings will provide corresponding risers as at 31a, 31b, and 31c. The ledges 30a etc. and the risers 31a, etc. is sized and shaped so that they fit the shaped octagular lower compartment 11 of the conventional expresso coffeemakers in reasonably snug sliding fit engagement when a given sized expresso coffeemaker is placed or fitted in engagement with at least one of the ledges 30a, 30b, and 30c formed in the circular raised section 28 on the upper surface 22 of the composite holder and opener.

It will be particularly noted that each of the risers 31a, 31b and 31c have a slight outward taper as shown by the distance d, d', and d" on FIG. 7 to facilitate the positioning of the lower compartment 11 of the expresso coffeemaker in a given indentation or ledge 30a, 30b and 30c and in engagement with the associated risers 31a, 31b and 31c and the removal from these indentations and risers. An approximate taper in a range from 2° to 5° has been found to be satisfactory for this purpose and to provide a reasonably snug sliding fit between the lower compartment of the expresso coffeemaker and the indentations on the composite holder and opener. Additionally, this taper allows for variation in the indentations and risers which may arise during manufacture of the composite holder and opener and/or on the shaped base of the expresso coffeemaker.

It will be understood by those skilled in the art that while the indentations or ledges 30a, 30b, and 30c and their associated risers 31a, 31b, and 31c are shown as having an octagonal shape that other shapes may be formed to fit other shaped and sized expresso coffeemakers without departing from the scope of the present invention.

In the illustrated form of the present invention an opening as at 32 is shown. This is utilized to reduce the amount of plastic required in the molding of the composite holder and opener in accordance with the present invention. It is also contemplated that the octagonal ledges 30a, 30b, and 30c and their associated risers 31a, 31b, and 31c can be embodied in a planar member whose thickness is sufficient to embed the octagonal indentations therein without the presence of the opening 32 as shown.

The size of the planar member 21 will vary according to the sizes of the expresso coffeemakers with which it is intended to be used. Sufficient material will be allowed around the largest ledge or indentation 30c to maintain structural soundness of the planar member 11. Thus the thickness of the planar member 21 or total elevation of the annular raised surface 28 will vary with the number of ledges embodied therein or with the desired design depending upon the eye appeal or other decoration that may be desirable or necessary for the composite holder and opener in accordance with the present invention.

In use the combined holder and opener 20 is placed on any given supporting surface 24' and can serve to hold the expresso coffeemaker 10 therein while it is hot. The clearance between the lower face of the expresso coffeemaker and the surface is sufficient to prevent heat being transmitted through the plastic or other heat resistant material of which the composite holder and opener is made. Thus the composite holder and opener can act as a hot plate for the expresso coffee holder.

However because the lower compartment of the expresso coffeemaker is adapted to fit and rest on the octagonal indentations or ledges 30a, 30b, and 30c and engage the risers or steps 31a, 31b, and 31c reasonably snugly, it will be clear that once the expresso coffeemaker has cooled down and it is desired to loosen or disconnect the annular threaded collar 15 from the threaded section 14 that the expresso coffeemaker upper section 12 can be grasped and rotational force applied thereto to break the water tight seal between the threaded section 14 and annular threaded collar 15 and thereby separate the upper compartment from the lower compartment. Since the composite holder and opener 20 is prevented from rotating, the lower compartment 11 will be held firm and as the upper compartment 12 is rotated the annular threaded collar 15 will separate from the threaded section 14 and the threaded connecting section 13 will be loosened and then the respective compartments may be easily disassembled so as to clean the expresso coffeemaker and prepare it for reuse.

While the composite holder and opener has been described for use with an expresso coffeemaker, it will be understood that the composite holder and opener is capable of many other uses wherein a shaped lower member is tightly connected to an upper member and loosening or disconnecting these members requires that the lower or base member be held immobile while applying the rotating force to the upper member.

Further it will be noted that the composite holder and opener in accordance with the present invention is a simple, cheap and versatile device easily adapted for its particular use.

It will be understood that the invention is not to be limited to the specific construction or arrangement of parts shown but that they may be widely modified within the invention defined by the claims.

What is claimed is:

1. A composite holder and opener for expresso coffeemakers of varying sizes and for use and engagement on and adjacent to the edge of a generally planar surface comprising:
   a. a planar member of predetermined thickness molded from plastic material which is heat resistant,
   b. said planar member having a fixed shape including at least one side edge, and a transverse shoulder connected to said planar member on said at least one side edge,
   c. said planar member having an upper face, and a lower face to engage and rest directly on the generally planar surface,
   d. said transverse shoulder having a length greater than the predetermined thickness of the planar member and disposed to engage the edge of the planar surface to prevent horizontal rotation when the composite holder and opener, is placed thereon, and
   e. means in said upper face shaped for sliding fit engagement with at least one of said expresso coffeemakers including, a plurality of octagonally shaped ledges of progressively enlarging diameters.

2. In the composite holder and opener as claimed in claim 1 wherein;
   a. the planar member has an enlarged raised and thickened portion on the upper face, and
   b. said plurality of octagonally shaped ledges disposed in the central portion of said enlarged raised and thickened portion on the upper face of the planar member.

3. In the composite holder and opener as claimed in claim 2 including,
   a. a second means on the planar member to prevent horizontal rotation thereof consisting of a plurality of spaced openings, and
   b. means disposed to extend through each of said plurality of openings for engagement with the generally planar surface when the composite holder and opener is resting thereon.

4. In the composite holder and opener as claimed in claim 1 wherein, the plastic material is from the group ABS, Lexxan, Lucite, Plexiglas, and a formable acrylic plastic.

5. In combination with expresso coffeemakers of varying sizes each having an octagonally shaped lower compartment, an upper compartment, a threaded connection, and a gasket fitted in the threaded connection to effectuate a water tight seal between said upper compartment and lower compartment of a composite holder and opener for use and engagement on and adjacent to the edge of a generally planar surface including:
   a. a planar member of predetermined thickness molded from plastic material which is heat resistant,
   b. said planar member having a fixed shape including at least one side edge, and a transverse shoulder connected to said planar member on said at least one side edge,
   c. said planar member having an upper face, and a lower face to engage and rest directly on the generally planar surface,
   d. said transferse shoulder having, a length greater than the predetermined thickness of the planar member and disposed to engage the edge of the planar surface to prevent horizontal rotation of the composite holder and opener, and e. means in said upper face shaped for sliding fit engagement with the octagonally shaped lower compartment of said expresso coffeemakers including, a plurality of octagonally shaped ledges of progressively enlarging diameters.

6. In combination as claimed in claim 5, the composite holder and opener wherein;
   a. the planar member has an enlarged raised and thickened portion on the upper face, and
   b. said plurality of octagonally shaped ledges disposed in the central portion of said enlarged raised and thickened portion on the upper face of the planar member.

7. In the combination as claimed in claim 5, wherein the composite holder and opener includes,
   a. second means on the planar member to prevent horizontal rotation thereof consisting of a plurality of openings, and
   b. means disposed to extend through each of said plurality of openings for engagement with the generally planar surface when the composite holder and opener is resting thereon.

8. In the combination as claimed in claim 5, wherein the plastic material is from the group ABS, Lexxan, Lucite, Plexiglas, and a formable acrylic plastic.

* * * * *